United States Patent

Chimera

[11] Patent Number: 5,348,043
[45] Date of Patent: Sep. 20, 1994

[54] UNIVERSAL VALVE COUPLING MEMBER

[76] Inventor: Cynthia M. Chimera, 3612 Straight Rd., Fredonia, N.Y. 14063

[21] Appl. No.: 147,407

[22] Filed: Nov. 5, 1993

[51] Int. Cl.⁵ .............................................. F16K 37/00
[52] U.S. Cl. ...................... 137/269; 137/559; 251/148; 285/69
[58] Field of Search ...................... 137/559, 551, 269; 251/148; 285/68, 69

[56] References Cited

U.S. PATENT DOCUMENTS

| 1,059,319 | 4/1913 | Schuyler | 285/68 |
|---|---|---|---|
| 2,670,009 | 2/1954 | Reeve | 251/148 |
| 3,052,489 | 9/1962 | Stoudt | 285/69 |
| 3,241,865 | 3/1966 | Pumphrey | 285/74 |
| 3,960,365 | 6/1976 | Horowitz | 285/69 |
| 4,550,928 | 11/1985 | Berg | 285/74 |
| 5,240,271 | 8/1993 | Hart et al. | 285/69 |

FOREIGN PATENT DOCUMENTS 250553  1/1963  Australia .............................. 285/68

Primary Examiner—A. Michael Chambers
Attorney, Agent, or Firm—James J. Ralabate

[57] ABSTRACT

A universal valve that can be converted into either a service valve or an emergency valve by merely removing or retaining a plug in an air outlet port. The valve is constructed of a material that will not easily corrode and therefore will extend the useful life of the valve. In addition, the valve has an elongated valve handle that permits better leverage when opening and closing the valve.

7 Claims, 2 Drawing Sheets

UNIVERSAL VALVE COUPLING MEMBER

This invention relates to a universal valve coupling member and, more particularly, to a universal valve employed to connect fluid pressure hoses or conduits used between vehicle tractors and trailers.

BACKGROUND OF THE INVENTION

Devices to connect air conduits used in tractor-trailer braking systems are known. Usually, connectors or valves are mounted on the front section of a trailer for connecting air supplies from the tractor to the trailer braking system. Hose couplings of the gladhand variety are the most commonly employed devices used in both single and double trailer systems. It is also well known in this type braking system to use two pressure conduits, one which is an emergency line or conduit and the other is a service line or conduit. The emergency line is generally charged at all times and the service line is generally charged when the driver applies the brakes by pushing down on the brake pedal in the tractor. Both of the lines lead from the rear of the tractor (since air source is in the tractor) from hoses or other flexible conduits to the trailer or trailers requiring this air source for braking. The forward ends of the trailer emergency and service lines terminate at gladhands and it is important that the tractor lines and gladhands be connected to the appropriate valves for the service and emergency lines of the trailer. This coupling of gladhand and shutoff cock (valve) requires the constant connection, disconnection, repair and replacement of the coupling components. Since the shutoff cock or valve has the more complex and detailed construction including air intakes and air ports, conduit connectors, air chambers, camming surfaces, movable valve handle, etc., it is more likely to become worn or corroded upon continued use. It is not uncommon for this metallic valve to become corroded and to freeze up so that it needs to be frequently replaced. This is true of both the service and emergency valves. Thus, the truck operator needs to keep several relatively expensive service valves and several emergency valves in stock since they have different constructions and cannot be used interchangeably. Also, since valves of different manufacturers must be compatible with each other because of standard usage, it has not been practical to change or modify the valves to any great extent. These valves, for example, may be used or coupled with components of another manufacturer and must always be compatible therewith. Therefore, any improvement in design or construction of these valves that would significantly improve their longevity, requires less inventory be held in stock or reduces their costs would be an important step forward in the art.

There are known several coupling devices used in tractor-trailer braking systems such as those disclosed in U.S. Pat. Nos. 3,052,489: 3,241,865; 3,960,365 and 4,550,928. In U.S. Pat. No. 3,052,489 (Stoudt) a coupling member is disclosed having a unitary coupling means with a lock arm for each coupling and provisions made for easier assembly. By employing strip steel in lieu of the rigid lock arms employed before, merely a stamped indentation provides sufficient detent locking without the necessity of any separate detent means as previously required. In Stoudt as in the other references noted above, separate valves are needed for use, one as an emergency valve and the other as a service valve. Users must keep an adequate supply of both in inventory for replacement of corroded or worn valves. Also, Stoudt is concerned only with couplings to be used between the tractor and a single trailer to be hauled. No shutoff valve or handle is required in Stoudt since a shutoff valve is only required when two trailers are to be hauled in tandem. The shutoff valve in a coupling device is used primarily as a two trailer hookup and is turned off (supply of air) when the vehicle is not moving or where only one trailer is going to be hauled.

In Pumphrey, U.S. Pat. No. 3,241,865, the use of both a service and an emergency valve is disclosed with each having means to prevent mismatching of couplings- Prior to Pumphrey, the letters "S" and "E" were stamped on the service and emergency respectively to distinguish each. Pumphrey provided unique abutments or lugs which were incompatibly positioned for preventing the wrong valve to be coupled, i.e. service valve with emergency gladhand, etc. Mismatching, therefore, of the emergency or service valves, especially in the dark was avoided by Pumphrey's invention. But Pumphrey taught the use of two separate valves, an emergency valve and a service valve. Also, Pumphrey, as all other valves disclosed by the noted prior art, are susceptible to corrosion after prolonged use. The coupling devices in all tractor-trailer usages are exposed to the elements such as rain and snow and can easily become corroded and rendered inoperative. This is true especially with moving parts of a valve such as the shutoff handles, etc. Therefore, Pumphrey's valve is limited to use in single trailer hookups, uses both separate emergency and service valves and, as are the other prior art valves, constructed of materials that will rust or corrode upon extended use.

In U.S. Pat. No. 3,960,365 (Horowitz), a combination gladhand and shutoff cock is disclosed for use on tandem or doubles operation. The gladhand used by Horowitz has a shutoff cock and a fitting positioned within a passage of the gladhand. This fitting is used in making a connection with a conduit on the trailer and also used is a spring-biased bushing between the fitting and shutoff cock for forming a seal. Horowitz discloses the use of valves which are similar in construction, except for the spring-biased bushing, to conventional valves used in tandem operations, i.e. emergency and service valves. Horowitz's device, unlike the others noted in the above patents, is useful in the rear of a trailer which will pull a second trailer.

Berg, U.S. Pat. No. 4,550,928 discloses a front air swingaway for connecting an air supply between a tractor-trailer combination. The swingaway is adapted to be mounted on the front of a trailer and projects forwardly when in use. It is automatically folded back against the front of the trailer when not in use, i.e. when it is not connected to a gladhand. Berg, however, is not concerned with use in a tandem operation but is rather limited for use when a single trailer is being hauled.

All of the above-discussed references except for Horowitz are concerned only with single trailer use, thus, shutoff cocks are not required in their devices. The present invention is adapted for use in tandem operations and thus requires a shutoff cock or component. All of the references discussed teach the use of conventionally constructed metallic valves, both service and emergency valves. These valves are, as noted earlier, are susceptible to rusting and corrosion from moisture, salt and the like. In addition, all references noted require the inventory supplies of both service and emergency valves since in the prior art they are not interchangeable.

SUMMARY OF THE INVENTION

It is therefore an object of this invention to provide a universal gladhand valve devoid of the above-noted disadvantages.

Another object of this invention is to provide a universal valve structured so that it can be used as both a service valve or an emergency valve.

A further object of this invention is to provide a coupling member valve that is substantially corrosion resistant and significantly extends the useful life of the valve.

A yet further object of this invention is to provide a simply constructed coupling member valve useful in tandem trailer systems.

Still another object of this invention is to provide a universal valve coupling member that will reduce required inventories since only one valve rather than two structures (service and emergency) needs to be kept in stock.

A still further object of this invention is to provide a novel long-lasting universal valve that will be less expensive to manufacture and easier to use.

Still yet another object of this invention is to provide a universal valve coupling member that is compatible with all conventionally used equipment and which provides easier operation.

These and other objects are accomplished by this invention by a universal valve gladhand coupling member (hereinafter "valve") that is one structure easily converted into use as either a service or emergency valve. Since only one valve can be used as either the service or emergency valve, it is no longer necessary to keep inventories of both valves, thus, inventories can be reduced by one-half. The valve of this invention can be used in tandem operations since it has a shutoff cock used to open or close the supply of air to the valve. The valve of this invention is to be used on the back of a lead trailer that has a pintle hook latch setup. It is critical to the present invention that the valve be constructed of a substantially non-corrosive material such as plastic, fiberglass, corrosion-proof metal or mixtures thereof.

Also, it is important to this invention that an extended easy moving handle be used to open or shut the air intake means of the valve. The term "elongated" will be used to describe the extended handle. By elongated is meant substantially longer than any prior art similar valve handle. This handle permits better leverage and is easier to use. Prior art valves have relatively short handles which are very difficult to use especially when the valve has any corrosion or after extended use. The most critical part of this invention is a plug that is in position for a service valve use and is removed for an emergency valve use. The plug comes installed with the valve and as is will be used as a service valve. When an emergency valve is required, the plug from one of the air outlets is removed converting the valve to an emergency valve with two air outlets. A service valve only requires one air outlet, therefore, the plug is kept in one air outlet (to block passage of air) when the structure is used for a service valve. As is known in the prior art, the emergency valve requires an inlet port and two air outlets, one to the air conduit for the brakes and the second outlet is for passage of air to the pintle to lock the pintle in place. The pintle, of course, is used to lock the dolly to the first trailer adjacent to the tractor.

The valve of this invention when made of plastic can be simply molded from one mold, therefore will be more economical to manufacture. Also, because it is plastic, there will be no corrosion from moisture and salt and the valve will not need to be replaced as often.

The present prior art valves are made from metal and require replacement quite often. As noted earlier, dealers with the valve of this invention will only need to stock one valve for all equipment. The valve of this invention can come with strip-off "E" (for emergency) and "S" (for service) so that they can be easily identified when in use. Any other suitable marking may be used to indicate use as a service or emergency valve.

DETAILED DESCRIPTION OF THE DRAWING AND THE PREFERRED EMBODIMENT

Figure 1:
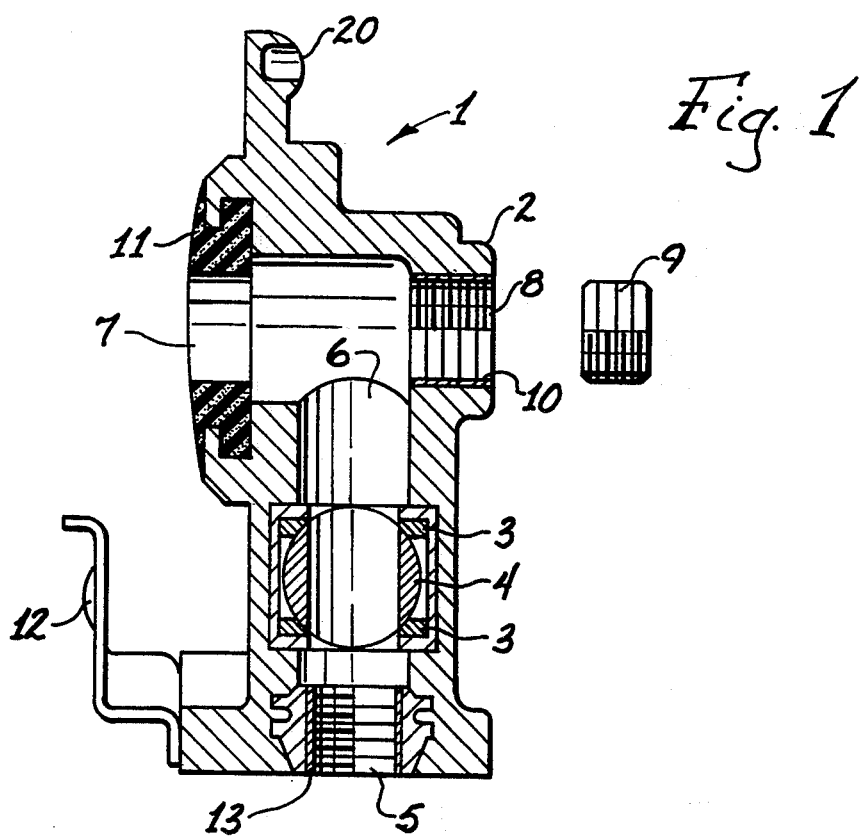
FIG. 1 is a first side plan cutaway view of the valve of this invention.

In FIG. 1 a first side plan view of the coupling member valve 1 of this invention is illustrated. The valve body 2 can be injection molded using a suitable durable plastic such as nylon, polyurethane, polyacrylates, polycarbonate, polyamides, polyesters, polystyrene or any other suitable plastic or copolymers and mixtures thereof. Also, plastic with fiberglass or metal may be used conditioned upon its having substantially optimum corrosion-free properties.

A specific nylon material that could be used is described in Hoechst Celanese Bulletins NY-1A, NY-B1 General Purpose 6/6 100 Series, Crystallization Controlled 6/6 1300 Series. The valve body 2 is easily injection molded and can have brass fittings 5 and 6 molded in position. Sealer 3 prevents airflow when the ball assembly 4 is in the closed position. The ball assembly 4 controls the airflow when in opened or closed positions. Air inlet 5 has a brass fitting 13 (threaded) that receives the main air supply connection from the tractor conduit or air tube. Air inlet fitting 5 can also easily be molded in position when the valve body 2 is molded or manufactured. The air chamber 6 extends in air flow connection through body 2 to air outlets 7 and 8. Outlet 8 is closed off by plug 9 when valve 1 is to be used as a service valve. To convert valve 1 to an emergency valve, the user merely removes plug 9 and he/she has an emergency valve with two air outlets 8 and 7. Air outlet 7 airflow connects valve 1 to the appropriate brake line and air outlet 8 airflow connects valve 1 to the pintle hook. Air outlet or port 8 has a threaded opening 10 that will mate with and receive threaded plug 9. Air port or outlet 7 has surrounding its peripheral portion a rubber or elastomeric seal 11 that seals two gladhands together. Lower detent latch 12 locks gladhand with the upper detent.

Figure 2:
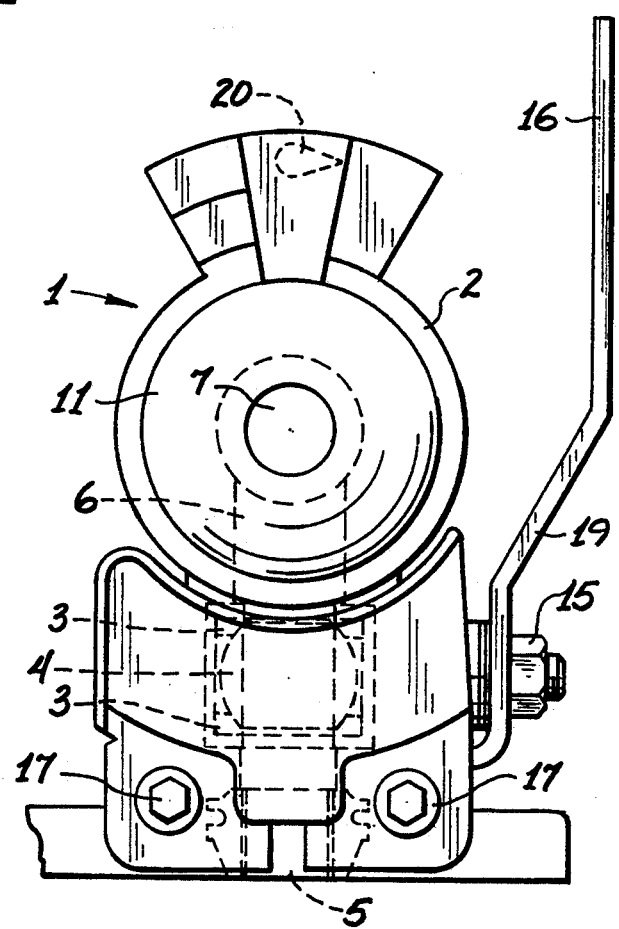
FIG. 2 is a front plan view of the valve of this invention.

In FIG. 2 a front plan view of the universal valve 1 of this invention is illustrated. In the front portion of valve 1 can be seen air brake outlet 7 and rubber seal 11. Air chamber 6 can be seen extending from air inlet 5 to air brake outlet 7, air outlet 8 to pintle is in the back of valve 1 and cannot be seen in this FIG. 2. The elongated handle 16 is illustrated angled away from housing 2 by arm 19 for easier operation and so the operator does not skin his hand or fingers when operating the handle 16. Also, as earlier noted, handle 16 is substantially longer than the prior art handles for ease of handling and so that the user can better grip the handle 16. Handle 16 via arm 19 is movably connected to ball assembly 4 which opens or closes the airflow into air chamber 6 by movement of handle 16. Nut and bolt 17 connect the valve housing 2 to valve mounting bracket or means 14. Nut and bolt 15 connect arm 19 to means that open and close ball assembly 4.

Figure 3:
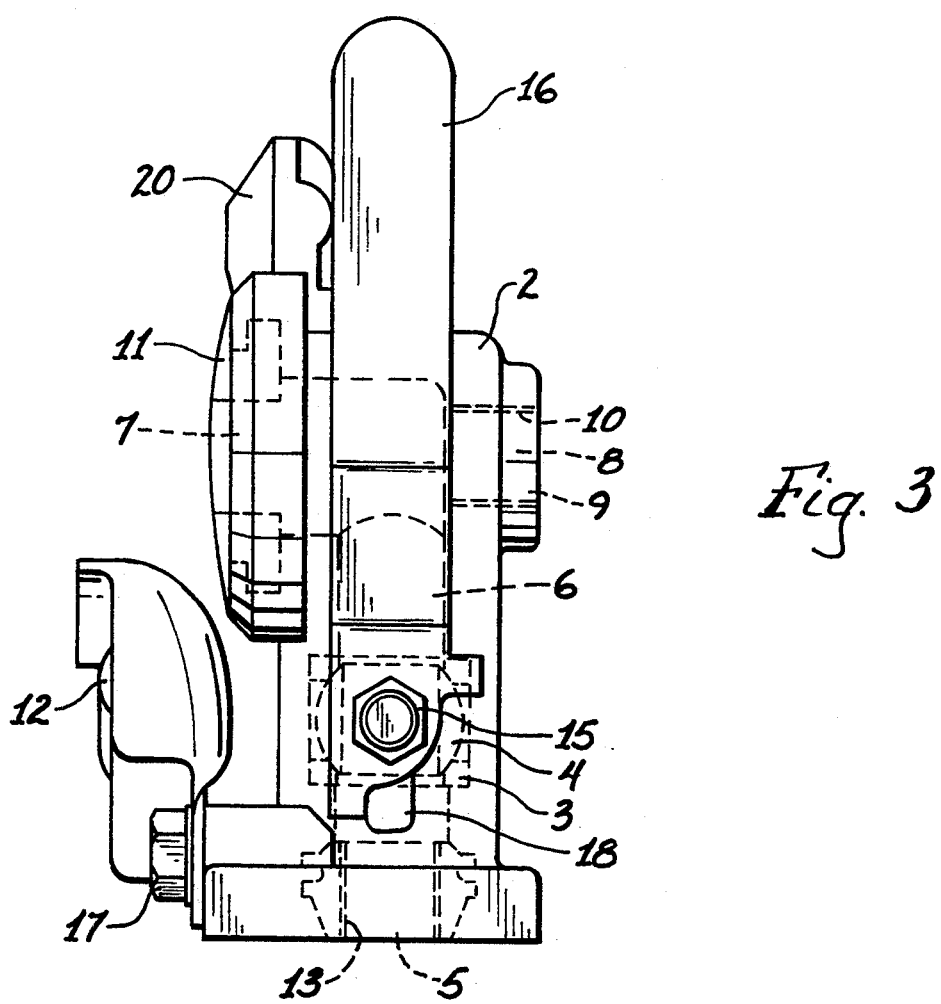
FIG. 3 is a second side plan view of the valve of this invention.
Figure 4:
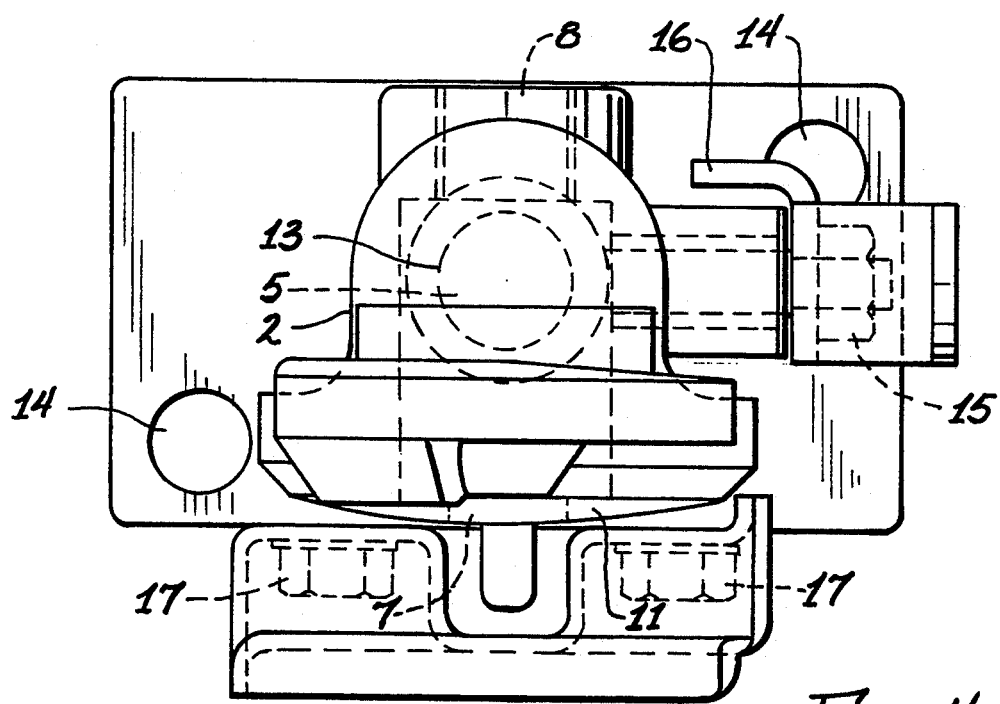
FIG. 4 is a top plan view of the valve of this invention.

In FIGS. 3 and 4 handle 16 is seen as it extends out from and above housing 2. In FIG. 3 air plug 9 is in place plugging air outlet 8 thereby providing only one air outlet 7, thus valve 1 is in FIG. 3 a service valve. The detent 12 is a hardened spring-like steel that is bolted to the body 2. When two gladhands are hooked together by mutual engagement of their locked ribs 20, the lock arms and the members are twisted together until the indentations on each arm snap together. The detent 12 is bolted to valve body 2 for easy replacement.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A universal valve coupling member comprising in combination a valve housing, an air chamber in said valve housing, a valve handle movably positioned on the exterior of said valve housing, control means extending from said handle to said air chamber, and valve mounting means for air connecting said universal valve from a rear portion of a first trailer to an adjacent surface of a front portion of a second trailer, said valve housing having at a first terminal end an air inlet port, and having at a second terminal end two air outlet ports, one of said two air outlet ports having a removable plug to prevent the escape of air therethrough, when said removable plug is in place in said air outlet said universal valve is used as a service valve, when said removable plug is removed from said air outlet said universal valve is used as an emergency valve, said control means and said handle means controlling the amount of air to enter said air chamber.

2. The universal valve of claim 1 wherein said housing is constructed of a substantially non-corrosive material.

3. The universal valve of claim 1 wherein said air chamber comprises one air inlet and one air outlet port thereby forming a service valve.

4. The universal valve of claim 1 wherein said air chamber comprises one air inlet port and two air outlet ports forming thereby an emergency valve.

5. The universal valve of claim 1 wherein said housing comprises a material selected from the group consisting of nylon, fiberglass, polyurethane, polycarbonate, polyacrylate, polyamides, polyesters, polystyrene, copolymers and mixtures thereof.

6. The universal valve of claim 1 wherein said housing is constructed of nylon.

7. The universal valve of claim 1 wherein said handle has means in airflow connection to said air chamber, said means activated via said handle to open or close said air inlet means.

* * * * *